Sept. 27, 1960   W. J. BARTHOLOMÄUS ET AL   2,953,992
DISCHARGE VALVE ASSEMBLY FOR FUEL INJECTION PUMPS
Filed May 4, 1954
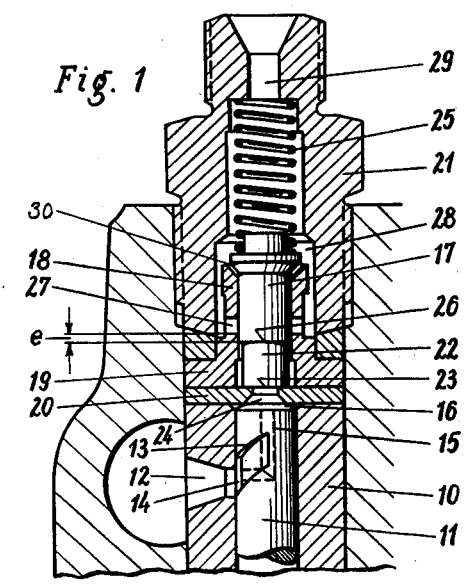
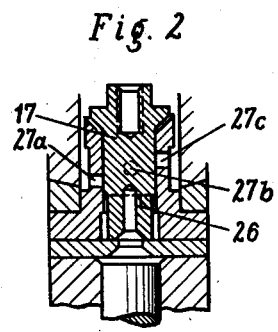
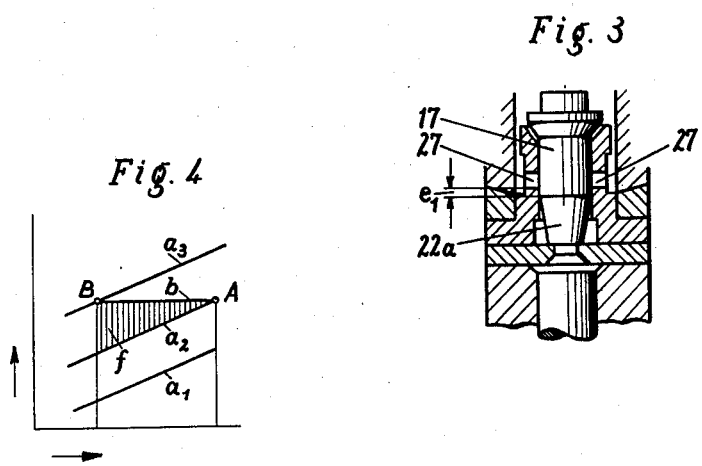
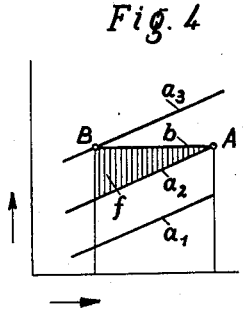
INVENTORS.
WERNER J. BARTHOLOMÄUS,
ROBERT J. WIRSCHING,
HEINZ P. SCHEYING.
BY Dicke and Craig.
ATTORNEYS.

United States Patent Office 2,953,992
Patented Sept. 27, 1960

2,953,992
DISCHARGE VALVE ASSEMBLY FOR FUEL INJECTION PUMPS

Werner J. Bartholomäus, Stuttgart, Robert J. Wirsching, Korntal, and Heinz P. Scheying, Stuttgart-Wangen, Germany, assignors to Daimler-Benz Aktiengesellschaft, Stuttgart-Unterturkheim, Germany Filed May 4, 1954, Ser. No. 427,581

Claims priority, application Germany May 11, 1953

2 Claims. (Cl. 103—41)

This invention relates to a device adapted for use in fuel injection pumps, particularly for injection type internal combustion engines and more particularly to a discharge and pressure valve which as a so-called relief valve will not release the cross-sectional area of the overflow port until after displacement of a certain volume and which, for the purpose of relieving the injection line after termination of the injection, effects a partial escape of the fuel from the injection line back to the pump suction preferably by spring pressure when the cross-section of the valve is closed. The normally ascending full load characteristic curve (injection charge per stroke in dependence on the speed) can thus be changed into a horizontal, respectively, slightly descending characteristic.

One object of the present invention is to provide a valve of simple and economic construction which may be easily made.

Another object of the present invention is to reduce the sensitiveness of the valve to inaccuracies in manufacture while improving the sealing effect at the same time.

A further object of the present invention is to provide a valve construction insuring an irreproachable control action of the valve in dependence on the different pump speeds.

A feature of the present invention therefore resides in having a valve which at the same time is formed both as a slide for controlling the pilot cross-section to the discharge or injection line and as a flat-seated surface which closes the pressure chamber of the pump. A valve thus formed is not only simple in design and more easy to build but also ensures dependable sealing of both the pump chamber and the double sealing surfaces to the pump chamber, on the one hand, and to the injection line, on the other hand, in that the flat sealing surface opposite to the pump chamber as well as the outer, for instance, cylindrical slide valve surface can respectively be made very accurately independently of the other sealing surface. In connection with this it is to be noted that an accurate centered fitting of the sealing surfaces, as is by way of example necessary for conical valve seats, can be avoided.

According to another feature of the invention, the pilot cross-section to the injection line will be opened only gradually with the valve stroke, so that at low speeds only a smaller cross-sectional area will be released, respectively only a smaller valve stroke than at high speeds of the pump will be carried out.

This can be accomplished thereby that the passage leading to the injection line is divided into single throttle openings of different cross-sectional area which are staggered as to each other and released in turn, or in that the slide valve portion which controls the pilot crosssection to the injection line is, in particular, conically formed in such a manner that at first a heavy and thereafter a gradually decreasing throttling of the passage of fuel will be produced during the valve stroke.

Other objects and features of the invention will become apparent from the following description taken in connection with the accompanying drawings which illustrate several embodiments of the invention. In the drawings:

Fig. 1 is a part sectional view of the pump with a valve constructed in accordance with the present invention, Figs. 2 and 3 illustrate a second and third embodiment of the invention, and Fig. 4 is a fuel quantity and speed (r.p.m.) diagram.

Referring now to the drawings it will be seen that the embodiment illustrated in Fig. 1 includes a pump cylinder 10 in which a pump piston 11 reciprocates in known manner which controls at the same time by means of a slanting edge 13 an overflow port 12 which simultaneously serves, for example, as suction opening. In conjunction with this the pilot edge 13 defines a groove 14 which through a bore 15 is in continuous communication with the pressure chamber 16 of the pump.

The discharge valve 17, which consists essentially of a cylindrical slide with pilot edge 26 and reduced portion 22, is slidably arranged in a bore 18 of a cylindrical insert 19 which is inserted on the cylinder 10 in the upper part of the pump housing with a plate 20 having aperture 24 interposed, and is held thereon by a cap nut 21.

During a pressure stroke of the valve and as soon as the suction line 12 is closed by the upper edge of the piston 11 and when the pressure within the pump chamber 16 exceeds that of the spring 25, the valve 17 will be raised until fuel is discharged through the bores 27 into the chamber 28 and injection line 29 after a stroke e of the valve.

On the return stroke of the piston 11 and even after the bores 27 no longer communicate with reduced portion 22 of discharge valve 17, the fuel is sucked back into chamber 28 consistent with the stroke e from the injection line due to the increase in volume of chamber 28 by the downward movement of valve 17, whereby a rapid closing of the injection valve will be effected and hence all after-drip from the injection nozzle prevented.

It will be noted that the control surface of the valve 17 arranged on the cylindrical surface 18, on the one hand, and a flat valve seating surface 23 of the valve, on the other hand, which is disposed perpendicular thereto, require no centering as to each other, so that the valve may be easily and accurately made. Moreover, a clearance 30 has been provided between the upper ends of valve 17 and cylindrical insert 19 so that the abutment of the flat valve seating surface 23 against plate 20 is assured.

In the embodiment of the invention according to Fig. 2, instead of the bores 27 arranged at the same level, there are provided bores 27a, 27b, 27c of different cross-section in the valve 17 which are axially staggered as to each other and released in turn by the pilot edge 26 of the valve 17 on the pressure stroke.

The mode of operation of the valve is substantially as follows:

By the hydraulic pressure within the pump chamber 16, the valve 17 is raised against the action of the spring 25 which is thus placed under compression, the hydraulic pressure being substantially proportional to the amount of compression of the spring. This pressure is, on the other hand, converted into velocity in the cross-bore 27a, etc. It is achieved thereby that at low speeds of the engine or of the injection pump, the discharge valve 17 is only relatively slightly raised against the action of the spring, since owing to the low speed, the fuel displaced by the piston may already escape without encountering greater resistance through the lowermost bore 27a, or lower bores 27a and 27b, to the pressure line, so that during the return of the piston, the valve 17 also performs only a relatively small stroke.

With higher speeds, the valve 17, as a result of the increased throttling, is forced back relatively far against the action of the spring 25, so that all the bores 27a to 27c are opened up at the highest speeds. The return stroke is accordingly larger too.

It further follows therefrom that the volume held back from the injection nozzle is relatively large at high speeds and relatively small at low speeds. Owing to the diminished volume of fuel sucked back, the quantity of fuel injected receives therefore an increase at low speeds, whereby in the case of slowing down of the engine, for example, as the vehicle which is driven by the engine negotiates a steep grade, the engine torque will be increased and hence "dying" of the engine prevented.

The so-called "assimilation" which hitherto could be obtained only with relatively complex regulating means, is thereby rendered unnecessary and is now achieved in the simplest manner.

In Fig. 4 the quantity of fuel injected in cubic millimeters per stroke is purely diagrammatically drawn above the speed (r.p.m.) of the pump. The ordinate represents the quantity of fuel injected per stroke of the pump while the abscissa represents the pump speed.

During fuel injection, the amount of fuel drawn by the pump normally rises slightly with increasing speed, as is diagrammatically indicated by the curves $a_1$, $a_2$, $a_3$. These curves differ from each other by the magnitude of the discharge volume (dimension $e$ of Fig. 1), $a_1$ being consistent with the largest discharge volume. They were taken with one and the same injection pump by exchanging the valves. By the use of a valve of Fig. 2 constructed in accordance with the invention it is attained that by decreasing the speed from a point A of the curve $a_2$, the effective discharge volume is reduced, so that the characteristic curve now resulting therefrom, tends to extend in an exactly horizontal, or almost horizontal direction towards point B lying on curve $a_3$ which corresponds to a small discharge volume. In Fig. 4 the quantity of fuel injected per stroke is therefore kept constant over the entire range of speed control, in that, corresponding to the cross-hatched area $f$, a relative increase of the injection volume as compared with $a_2$ is achieved.

A similar effect can be obtained if in accordance with the embodiment of the invention shown in Figure 3, which is provided with bores 27 arranged at the same level, the valve 17 is provided with a conical extension 22a which after a certain stroke $e_1$ releases the holes 27 at first with great and then with gradually decreasing throttling. A staggered arrangement of the throttle bores 27a, b, c, etc. can of course also be combined with the conical valve arrangement 22a. Instead of single bores 27a, there can be provided helical slots, and instead of cone 22a there can be used a throttle extension of different shape, as occasion will require.

It will be obvious that various modifications can be made in the embodiments above described without in any way departing from the spirit of the invention as defined in the appended claims.

What we claim is:

1. In a fuel injection pump the combination of pump chamber with a pump member for achieving a drawing effect, a discharge line and a control device for controlling the connection between said pump chamber and said discharge line and comprising a pilot housing having an essentially cylindrical bore, a substantially level closing wall with a first opening therein restricting said cylindrical bore, said cylindrical bore being in communication with said pump chamber, at least one lateral opening in the wall surrounding said cylindrical bore, said lateral opening being in communication with said discharge line, and a plunger-like pilot member slidingly arranged within said cylindrical bore provided with a truncated cone-shaped end portion including an end face cooperating with said substantially level closing wall and adapted for shutting off said first opening from the interior of said cylindrical bore, the base of said cone-shaped portion forming a pilot edge on said pilot member in the proximity of said lateral opening sliding upon the cylindrical surface of said cylindrical bore such that it will not uncover said lateral opening until after a certain stroke by said pilot member away from said substantially level closing wall to thereby establish communication between said first opening and said lateral by way of the interior of said cylindrical bore, said cone-shaped portion together with said pilot edge producing at first a great and thereafter a gradually decreasing throttling of the passage of fuel from the interior of said cylindrical bore to said lateral opening during the upward stroke of said pilot member.

2. In a fuel injection pump, the combination of a pump chamber with a pump member for achieving a suction effect, a discharge line and a control device for controlling the connection between said pump chamber and said discharge line comprising a pilot housing having an essentially cylindrical bore, a substantially flat annular disk with a central opening thereof restricting said cylindrical bore, said cylindrical bore being in communication with said pump chamber, means for securing said annular disk intermediate said pilot housing and said pump chamber, at least one lateral opening in the pilot housing wall surrounding said bore, said lateral opening being in communication with said discharge line, and a plunger-like pilot member slidingly arranged within said bore provided with a truncated cone-shaped extension including a substantially flat end face cooperating with the wall of said substantially flat annular disk for shutting off said central opening from the interior of said cylindrical bore, the base of said cone-shaped extension forming a pilot edge on said pilot member in the proximity of said lateral opening sliding upon the cylindrical surface of said bore in such a manner that it will not open said lateral opening until after the occurrence of a predetermined stroke by said pilot member in the direction away from said substantially flat annular disk wall to thereby establish a communication between said central opening and said lateral opening by way of the interior of said cylindrical bore, said cone-shaped extension together with said pilot edge producing at first a large and thereafter a gradually decreasing throttling of the passage of fuel from the interior of said cylindrical bore to said lateral opening during the upward stroke of said pilot member.

References Cited in the file of this patent

UNITED STATES PATENTS

| 2,007,871 | Oldham | July 9, 1935 |
| 2,090,351 | Heinrich et al. | Aug. 17, 1937 |
| 2,144,861 | Truxell | Jan. 24, 1939 |
| 2,163,313 | Voit | June 20, 1939 |
| 2,333,698 | Bremser | Nov. 9, 1943 |
| 2,380,148 | Camner | July 10, 1945 |
| 2,384,011 | Bremser | Sept. 4, 1945 |
| 2,552,777 | French | May 15, 1951 |
| 2,575,955 | Hatch | Nov. 20, 1951 |
| 2,582,535 | Drouot | June 15, 1952 |

FOREIGN PATENTS

| 257,211 | Switzerland | Sept. 30, 1948 |
| 358,745 | Italy | Apr. 28, 1938 |
| 861,343 | Germany | Dec. 29, 1952 |
| 862,974 | Germany | Jan. 15, 1953 |